Patented Oct. 9, 1934

1,976,342

UNITED STATES PATENT OFFICE 1,976,342

METHOD OF ELECTRIC FLASH WELDING

Warren F. Heineman, Shorewood, Wis., assignor to A. O. Smith Corporation, Milwaukee, Wis., a corporation of New York No Drawing. Application October 29, 1932, Serial No. 640,338

5 Claims. (Cl. 219—10)

This invention relates to electric flash welding.

An object of the invention is to provide a method of flash welding by which a more perfect weld is obtained between the pieces joined.

Another object is to obtain greater uniformity of welding conditions particularly where long relatively thin edges are being welded as in the welding of longitudinal seams in pipe sections of the order of forty feet in length.

Another object is to provide a method wherein the flashing arc is maintained shorter during the final flashing period, thereby preventing contamination of the joint by the atmosphere at the time of closing the gap and pressing the edges together.

Another object is to provide a method in which the edges are flashed away more slowly to thereby obtain a greater depth of heating of the edges whereby any inequality in the seam cleft will not affect the final interfusion of the edges and whereby a more equal final pressure is obtained throughout the joint at the time of welding.

Another object is to provide a method in which the edges are heated more slowly to afford ample time for equalization of temperatures and thereby prevent local overheating and sudden expulsion of the overheated metal and the formation of gaps that may be too large to close up, causing local weaknesses in the joint.

The invention has been applied in practice in flash welding sections of pipe for use in underground transcontinental pipe line systems for the transportation of oil and natural gas. Such pipe may be from eight to over thirty inches in diameter in forty foot lengths and have a wall thickness ranging from one-eighth inch to several times that thickness depending upon the requirements in use and whether special high strength or alloy steel is employed or whether ordinary low carbon steel is used.

As a specific illustration of the process of this invention, as applied to a pipe section of one-fourth inch wall thickness, the flashing arc is established substantially the entire length of the section while maintaining an applied potential from the secondaries of the welding transformers as shown by measurement of the open circuit potential drop between the electrodes of about five to eight volts. As the flashing arc becomes established, the edges are fed faster toward each other to compensate for the more rapid flashing away of the edges.

After the flashing arc has become established substantially throughout the length of the seam being welded, the applied potential of the secondaries of the welding transformers is reduced, preferably to about four volts as measured across the electrodes at the seam. At the same time, or immediately thereafter, the edges are moved closer together to reduce the arc gap and maintain the required flashing current across the gap.

The edges are fed toward each other at as fast a rate as the consumption of the edges in the several longitudinal portions of the seam will permit without extinguishing the arc and causing sticking of the edges. After a predetermined consumption of the edges, the current is cut off and the edges are closed by sufficient pressure, preferably from 5,000 to 10,000 pounds per square inch to effect the welding of the edges and an extrusion of the fluid or plastic metal from the joint.

By employing as short a flashing arc as possible and as low an applied potential as will maintain a flow of the required flashing current during the final period of flashing and prior to the application of pressure to the edges, a smoother flashing arc is obtained with less erratic expulsion of metal and with more uniform heating throughout the length of the edges.

For thinner metal relatively lower starting and finishing voltages than those specified above may be employed and for thicker metal higher voltages are preferable. Such specific requirements in potential may be readily determined for any given metal and dimension to obtain the best results, the practice of the present invention being directed to a reducing of the applied potential during the flashing operation in any given case.

In welding, as practiced under the invention, a plurality of transformers are arranged to supply the low voltage welding current independently to the several longitudinal portions of the seam, the transformers being commonly supplied with current from a single phase alternating current generator of suitable capacity and design. In order to reduce the applied potential at the seam, the operator is provided with a rheostat which controls the excitation of the field of the generator. By operating the rheostat control at the right time in the flashing operation, he can reduce the field excitation of the generator either directly or indirectly and thereby effect the desired reduction in applied potential at the electrodes.

The amount of reduction in the applied potential accomplished by reducing the field excitation of the generator and also by the shortening of the arc gap amounts generally from 25 to 50% of the original open circuit applied potential for starting the flashing arc, thereby providing a finishing potential drop between the electrodes of 50 to 75% of the starting potential drop.

The starting potential to be employed in any given case will depend upon economy of time, the essential being that the edges become sufficiently heated throughout their length to permit the change to a lower voltage arc with higher amperes. The finishing potential to be employed for the final period of flashing is preferably as low as the mechanical perfection of the machine will permit of without resulting in sticking of the edges.

In the practice of the invention wherein a lower potential is employed during the finishing stage of the flashing arc, a less expulsive arc is obtained and the edges are consumed more uniformly and at a slower rate than where a higher potential is used, thereby resulting in the edges becoming more nearly complementary and in a more uniform and greater depth of heating. The uniform depth of heating will result in a more uniform application of the welding pressure and there will be no weak area caused by excessive softness of the metal preventing the effective application of the pressure.

The time of maintaining the higher starting potential will depend upon the difficulty encountered in any given case of establishing a substantially uniform flashing arc for the length of the edges; in the specific illustration of welding a ¼" thick seam 40 feet in length, this time may range in practice from 15 to 40 seconds.

The time of the later or finishing stage of the flashing arc, at the lower voltage, will depend upon the depth of heating desired and in practice, in the illustration above, amounts to about 15 seconds, the stock being heated to plasticity for a depth of about ¼". Different depths of heating will be desired for different metals and for different thicknesses of metal, to obtain the best results.

For economy, the process should be carried out in a manner requiring as little consumption of metal as possible. However, too great a limitation in this respect may reduce the quality of the weld, and in the illustration given above, practice has established the best results when from ¼ to ½ inch on each edge is consumed by the flashing arc and the final extrusion of metal from the joint under pressure. The actual allowance for consumption of metal in commercial operations will depend principally upon the preparation of the edges and whether difficulty is encountered in maintaining the flashing arc without repeating the starting of the welding operation.

I claim:

1. The method of flash welding metal edges of considerable length in which a relatively high potential source is employed during the period of establishing the flashing arc and a relatively low potential source is employed during the principal period of flashing and immediately prior to the application of welding pressure to the edges.

2. The process of flash welding metal edges of considerable length which comprises establishing the flashing arc substantially throughout the extent of the edges while employing a relatively high potential, thereafter reducing the applied potential and shortening the flashing arc to obtain more uniform heating of the edges, and finally applying welding pressure to the edges simultaneously throughout to effect the welded joint.

3. In electric flash welding of metal edges of considerable length, after the flashing arc has been established substantially throughout the edges, the step of reducing the applied potential to obtain a more quiet arc and allow a shorter arc to be maintained with less expulsion of metal immediately prior to the application of welding pressure to the edges.

4. The process of flash welding metal edges of considerable length which comprises establishing the flashing arc substantially throughout the extent of the edges, thereafter reducing the applied potential and shortening the flashing arc until the potential drop across the arc gap approximates from fifty to seventy-five percent of the applied open circuit potential maintained during the period of establishing the arc, and finally, after the edges have become uniformly heated to the required extent, applying pressure thereto to effect the weld simultaneously throughout the joint.

5. The process of electric flash welding metal edges of considerable length comprising establishing the flashing arc substantially throughout the extent of the edges with an applied open circuit potential from five to eight volts, thereafter continuing the flashing arc with an applied potential from three to five volts to obtain uniform heating of the edges, and finally applying pressure to the edges simultaneously throughout to effect a weld.

WARREN F. HEINEMAN.